(12) United States Patent
Suryanarayana et al.

(10) Patent No.: US 11,494,197 B2
(45) Date of Patent: Nov. 8, 2022

(54) ENABLING A PRE-BOOT SCREEN TO BE ACCESSED REMOTELY

(71) Applicant: Dell Products L.P., Round Rock, TX (US)

(72) Inventors: Shekar Babu Suryanarayana, Bangalore (IN); Virupakshi Channagiri Manjunath, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 194 days.

(21) Appl. No.: 16/889,258

(22) Filed: Jun. 1, 2020

(65) Prior Publication Data

US 2021/0373910 A1    Dec. 2, 2021

(51) Int. Cl.
*G06F 9/00*     (2006.01)
*G06F 15/177*   (2006.01)
*G06F 9/4401*   (2018.01)
*H04L 9/40*     (2022.01)

(52) U.S. Cl.
CPC ........ *G06F 9/4416* (2013.01); *H04L 63/0428* (2013.01)

(58) Field of Classification Search
CPC .......................... G06F 9/4416; H04L 63/0428
See application file for complete search history.

(56) References Cited

U.S. PATENT DOCUMENTS

| | | | | |
|---|---|---|---|---|
| 9,622,076 B2* | 4/2017 | Park | ...................... | H04W 4/023 |
| 11,354,259 B1* | 6/2022 | Hilland | ................. | G06F 9/4406 |
| 2004/0153579 A1* | 8/2004 | Shih | .......................... | G06F 3/00 |
| | | | | 710/1 |
| 2005/0055486 A1* | 3/2005 | Natu | ...................... | G06F 3/1454 |
| | | | | 710/260 |
| 2012/0226910 A1* | 9/2012 | Hutzler | .................. | G06F 21/88 |
| | | | | 726/28 |
| 2013/0007435 A1* | 1/2013 | Bayani | ...................... | G06F 9/00 |
| | | | | 713/2 |
| 2013/0104215 A1* | 4/2013 | Cheng | ................. | H04L 41/0853 |
| | | | | 709/223 |
| 2014/0101575 A1* | 4/2014 | Kwak | ................... | G06F 3/0486 |
| | | | | 715/761 |
| 2015/0378557 A1* | 12/2015 | Jeong | ................. | H04M 1/0241 |
| | | | | 715/835 |

(Continued)

*Primary Examiner* — Mohammed H Rehman
(74) *Attorney, Agent, or Firm* — Kirton McConkie; Brian Tucker (57) ABSTRACT

A pre-boot screen can be accessed remotely. A remote access BIOS module can be employed on a computing system to logically split a GPU into a local screen rendering part and a remote access part and to logically split GPU memory into a local screen memory region and a remote access memory region. The remote access part of the GPU can access a pre-boot screen that has been copied to the remote access memory region and create network packets with payloads containing the pre-boot screen. The remote access part can then cause the network packets to be transferred to a NIC for delivery to a remote computing system. A remote access application on the remote computing system can extract and display the pre-boot screen. The remote access application can relay any user input back to the remote access BIOS module which can then cause the user input to be implemented locally.

20 Claims, 7 Drawing Sheets

(56) References Cited

U.S. PATENT DOCUMENTS

2016/0239314 A1* 8/2016 Suryanarayana ....... H04L 69/22
2017/0180272 A1* 6/2017 Bernath .................... G06T 1/20
2019/0379723 A1* 12/2019 Demasi ............... G06F 9/45533

* cited by examiner

ENABLING A PRE-BOOT SCREEN TO BE ACCESSED REMOTELY

CROSS-REFERENCE TO RELATED APPLICATIONS

N/A

BACKGROUND

BIOS firmware (BIOS) is the first software that is executed on the CPU when a computing system is powered on. The primary task of the BIOS is to initialize the hardware and load the operating system (OS). For purposes of this specification and the claims, the term BIOS should be construed as encompassing conventional BIOS, Unified Extensible Firmware Interface (UEFI) BIOS and any other similar firmware that is used to boot a computing system.

In a UEFI-based system, the BIOS is loaded to perform the boot process in a number of phases. The security (SEC) phase is the initial phase which prepares the computing system for the Pre-EFI initialization (PEI) phase. During the PEI phase, PEIM modules (or drivers) are loaded to initialize the low level hardware such as the system memory. Additional UEFI services are also loaded and provide an interface for subsequent stages including the Driver Execution Environment (DXE) phase in which UEFI drivers are loaded to perform a variety of tasks. The boot process will then transition to the Boot Device Selection (BDS) phase where the GUID Partition Table (GPT) is accessed to identify and load the boot loader. The boot loader will then load the OS kernel and transfer control the OS as part of transitioning to the runtime (RT) phase.

Various techniques exist for remotely accessing a computing system's screen. For example, remote display protocols, such as Microsoft's Remote Desktop Protocol (RDP), can be used to access and control a desktop or application running on a remote computing system. Technical support teams may oftentimes employ a remote display protocol to obtain access to a customer's computing system and to diagnose and repair any issues. However, remote display protocols will only allow such access while the operating system on the remote computing system is running. Once the computing system is rebooted, the technical support team will lose access and will not regain it until the operating system is again running. Accordingly, the use of remote display protocols or other similar techniques do not enable access to a computing system's pre-boot environment. This is particularly problematic in the technical support scenario where it is oftentimes necessary to make configuration changes in the BIOS to repair an issue. In fact, it is not uncommon for a customer to contact technical support because a computing system is failing to boot the operating system. In such scenarios, the technical support team will likely have no options for remotely accessing the computing system. Although Intel has developed a hardware-based solution for remotely accessing a computing system's pre-boot environment, if a computing system does not include the customized hardware—which is the case with most computing systems, this solution will be unavailable.

BRIEF SUMMARY

The present invention extends to methods, systems, and computer program products for enabling a pre-boot screen to be accessed remotely. A remote access BIOS module can be employed on a computing system to logically split a GPU into a local screen rendering part and a remote access part and to logically split GPU memory into a local screen memory region and a remote access memory region. The remote access part of the GPU can access a pre-boot screen that has been copied to the remote access memory region and create network packets with payloads containing the pre-boot screen. The remote access part can then cause the network packets to be transferred to a NIC which in turn will send the network packets to a remote computing system. A remote access application on the remote computing system can extract and display the pre-boot screen to thereby enable a support technician to view and access and the pre-boot screen remotely. The remote access application can relay any user input back to the remote access BIOS module which can then cause the user input to be implemented locally.

In some embodiments, the present invention may be implemented as a method for enabling a pre-boot screen to be accessed remotely. During pre-boot on a computing system, a remote access BIOS module that is executed on a CPU of the computing system can create a remote access part in a GPU of the computing system and a remote access memory region in GPU memory. The remote access BIOS module can copy a pre-boot screen from a local screen memory region in the GPU memory to the remote access memory region. The remote access part can then create one or more network packets that include the pre-boot screen that was copied to the remote access memory region. The remote access part can transfer the one or more network packets to a NIC to thereby cause the NIC to send the one or more network packets to a remote access application executing on a remote computing system.

In some embodiments, the present invention may be implemented as computer storage media storing computer executable instructions which when executed on a computing system implement a method for enabling a pre-boot screen of the computing system to be accessed on a remote computing system. This method can include: copying, by a remote access BIOS module that executes on a CPU of the computing system, a pre-boot screen from a local screen memory region in GPU memory to a remote access memory region in GPU memory; in conjunction with copying the pre-boot screen, sending, by the remote access BIOS module, a remote access request to a remote access part of a GPU of the computing system; in response to the remote access request, creating, by the remote access part, one or more network packets containing the pre-boot screen that was copied to the remote access memory region, the one or more network packets including an IP address of the remote computing system; and transferring, by the remote access part, the one or more network packets from the remote access memory region to a NIC of the computing system to thereby cause the one or more network packets to be sent to the remote computing system.

In some embodiments, the present invention may be implemented as a method for enabling a pre-boot screen to be accessed remotely. In response to a pre-boot screen being updated on a computing system, a remote access BIOS module executing on a CPU can copy the pre-boot screen from a local screen memory region in GPU memory to a remote access memory region in GPU memory. In response to the pre-boot screen being copied to the remote access memory region, a remote access part executing on a GPU can create one or more network packets that include the pre-boot screen and store the one or more network packets in a packet queue in the remote access memory region. The remote access part can then transfer the one or more network packets from the packet queue to a NIC to thereby cause the NIC to send the one or more network packets to a remote access application executing on a remote computing system.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In the specification and the claims, the term "computing system" should be construed as encompassing desktops, laptops, tablets, smart phones, other mobile devices or any other type of end user computing device that includes BIOS and an operating system. The term "BIOS" should be construed as firmware that is executed on a computing system to initialize the computing system and load the operating system.

Figure 1:
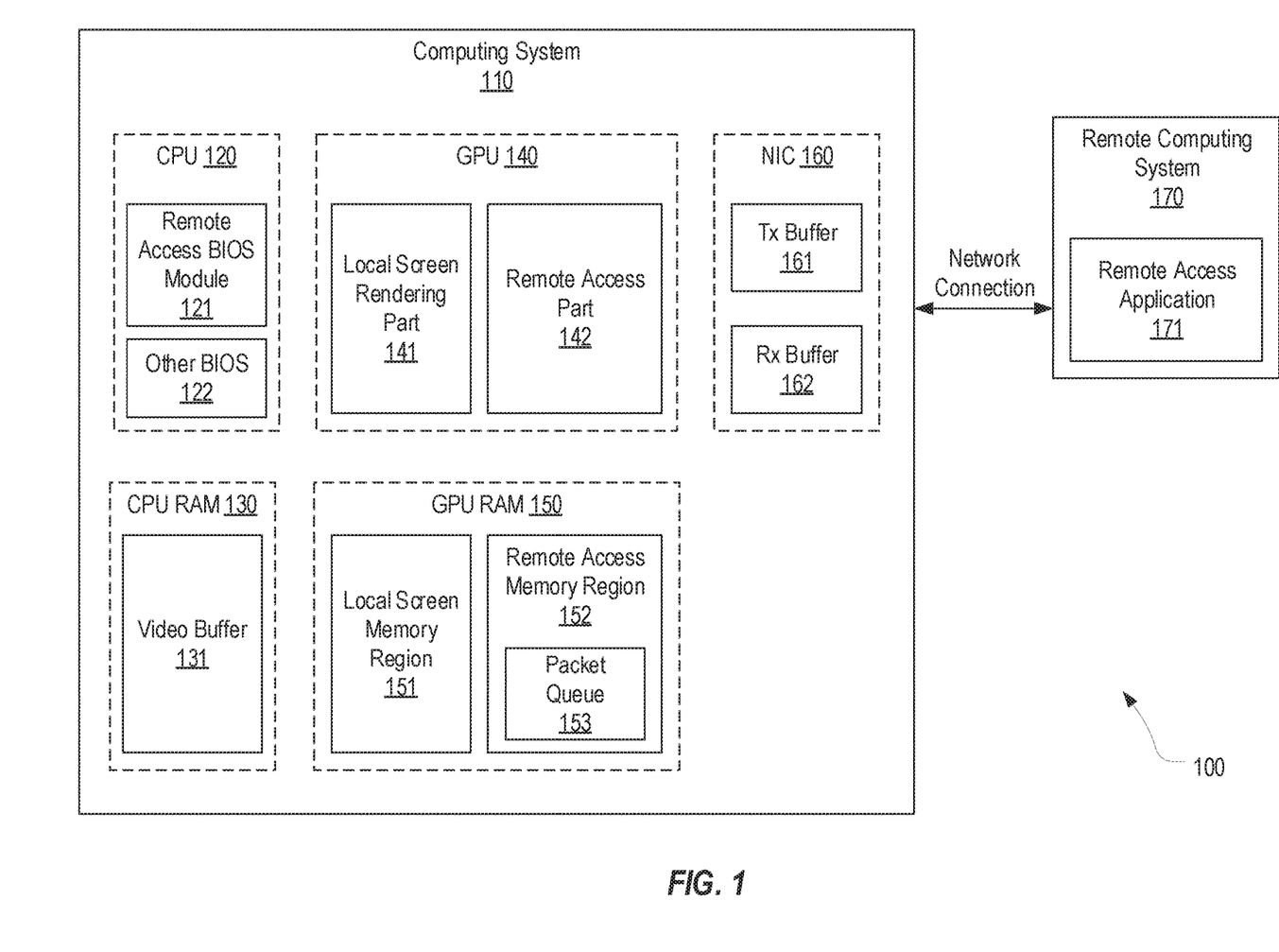
FIG. 1 illustrates an example computing environment in which the present invention can be implemented and an example architecture of a computing system that is configured to implement embodiments of the present invention.

FIG. 1 illustrates an example computing environment 100 in which embodiments of the present invention may be implemented. Computing environment 100 includes a computing system 100 and a remote computing system 170. Remote computing system 170 can represent any computing system that a technical support team or any other individual may employ to remotely access a pre-boot screen of computing system 110. Remote computing system 170 may include a remote access application 171 for this purpose. In typical embodiments, remote access application 171 may be browser-based but could equally be a desktop, mobile or other type of application.

FIG. 1 also illustrates various components that may be employed on computing system 110 to enable remote access application 171 to access computing system 110's pre-boot screen. As represented in dashed lines, computing system 110 has various hardware components including a CPU 120, CPU RAM 130, a GPU 140, GPU RAM 150 and a NIC 160. A remote access BIOS module 121 may be included in the BIOS of computing system 110. Therefore, during the pre-boot process, remote access BIOS module 121 will be loaded and executed by CPU 120. During the pre-boot process, other BIOS 122, which may represent standard BIOS modules, will maintain a video buffer 131 in CPU RAM 130 for displaying the pre-boot screen.

Remote access BIOS module 121 can cause GPU 140, or more particularly, the cores of GPU 140, to be logically split into two parts: a local screen rendering part 141 and a remote access part 142. Local screen rendering part 141 can encompass the standard functionality for rendering and displaying the pre-boot screen locally. In other words, local screen rendering part 141 can encompass standard code that GPU 140 provides (e.g., via APIs), and remote access BIOS module 121 can cause such code to be executed in a first set of cores of GPU 140. In contrast, remote access part 142 can constitute functionality for transferring the pre-boot screen to remote access application 171. For example, remote access part 142 can represent code that remote access BIOS module 121 provides (e.g., by employing the Compute Unified Device Architecture (CUDA)) and causes to be executed on a second set of cores.

Remote access BIOS module 121 can also cause GPU RAM 150 to be logically split into two regions: a local screen memory region 151 and a remote access memory region 152 that implements a packet queue 153. Local screen memory region 151 can be employed for displaying the pre-boot screen locally. For example, other BIOS 122 can cause the pre-boot screen to be displayed locally by copying video buffer 131 to local screen memory region 151. Local screen rendering part 141 will then employ local screen memory region 151 to render and display the pre-boot screen locally.

In contrast, and as explained in greater detail below, remote access BIOS module 121 can leverage remote access part 142 to cause the pre-boot screen to be transferred via NIC 160 to remote access application 171. Remote access application 171 can then display the pre-boot screen on remote computing system 170. As a user interacts with the pre-boot screen displayed on remote computing system 170, remote access application 171 can relay the user input back to remote access BIOS module 121 which can then implement the user input locally. This process can be repeated as the pre-boot screen is updated including in response to the user input received from remote access application 171.

Figure 2A:
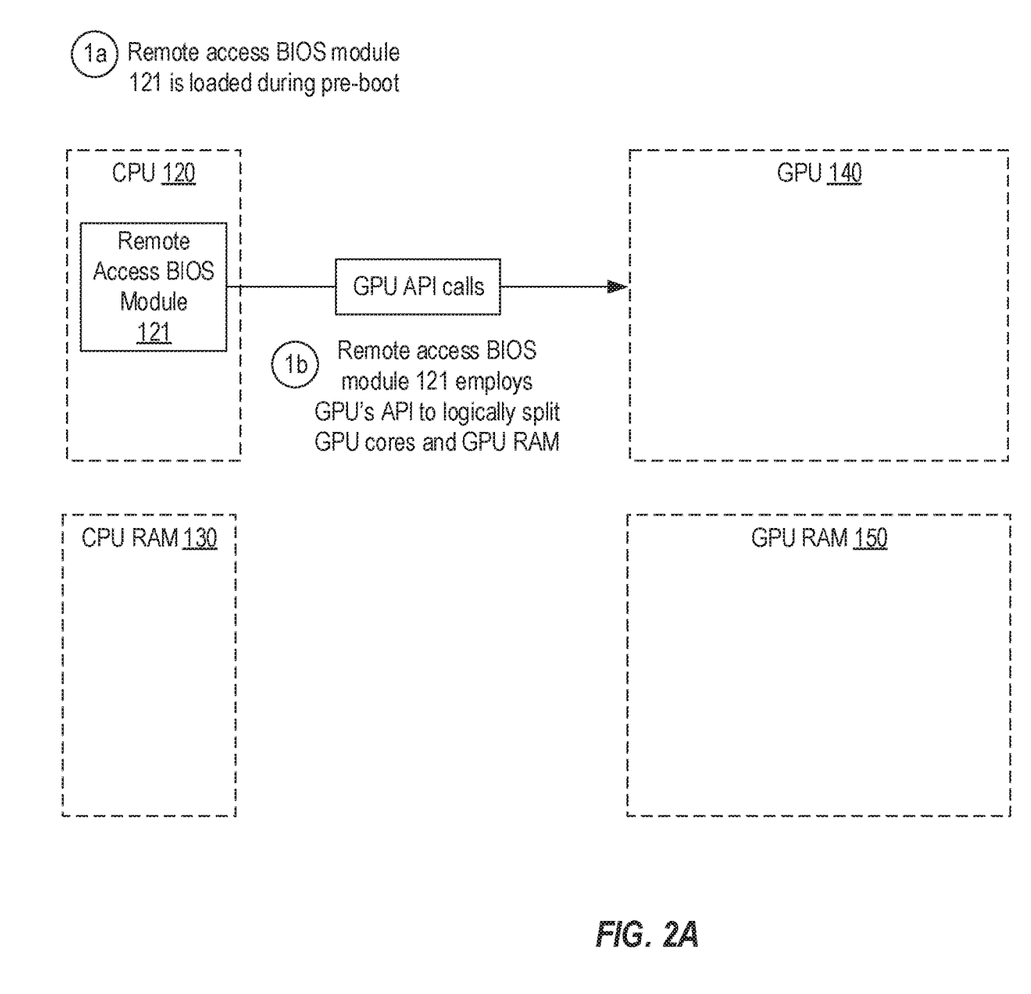
FIGS. 2A-2E illustrate an example of how a pre-boot screen can be accessed remotely in accordance with embodiments of the present invention.

FIGS. 2A-2F provide a more detailed example of how remote access BIOS module 121 can cause the pre-boot screen to be accessible to remote computing system 170. FIG. 2A can represent the state of computing system 110 during the pre-boot process. As represented in step 1a, remote access BIOS module 121 can be loaded during the pre-boot process. For example, remote access BIOS module 121 could be a DXE driver in a UEFI-based implementation. In some embodiments, computing system 110 could be configured to load remote access BIOS module 121 only when a configuration setting is set. For example, while the operating system is running on computing system 110, a support technician could employ remote access application 171 (or another remote access tool) to access computing system 110 and set a BIOS option that causes remote access BIOS module 121 to be loaded at reboot. As part of configuring remote access BIOS module 121 to be loaded at reboot, the support technician could also provide an IP address of remote computing system 170. Computing system 110 could store this IP address for the reasons described below.

As represented in step 1b, when remote access BIOS module 121 is executed, it can employ GPU 140's APIs (or similar functionality) to cause GPU 140 to be logically split into local screen rendering part 141 and remote access part 142 and to cause GPU RAM 150 to be logically split into local screen memory region 151 and remote access memory region 152. In some embodiments, after logically splitting GPU 140 and GPU RAM 150, remote access BIOS module 121 can cause GPU 140 to reinitialize GPU RAM 150 to thereby make local screen memory region 151 and remote access memory region 152 available. As stated above, remote access part 142 can encompass functionality for transferring the pre-boot screen to remote access application 171 and could be in the form of functions that remote access BIOS module 121 causes to be executed on GPU 140 rather than on CPU 120.

Figure 2B:
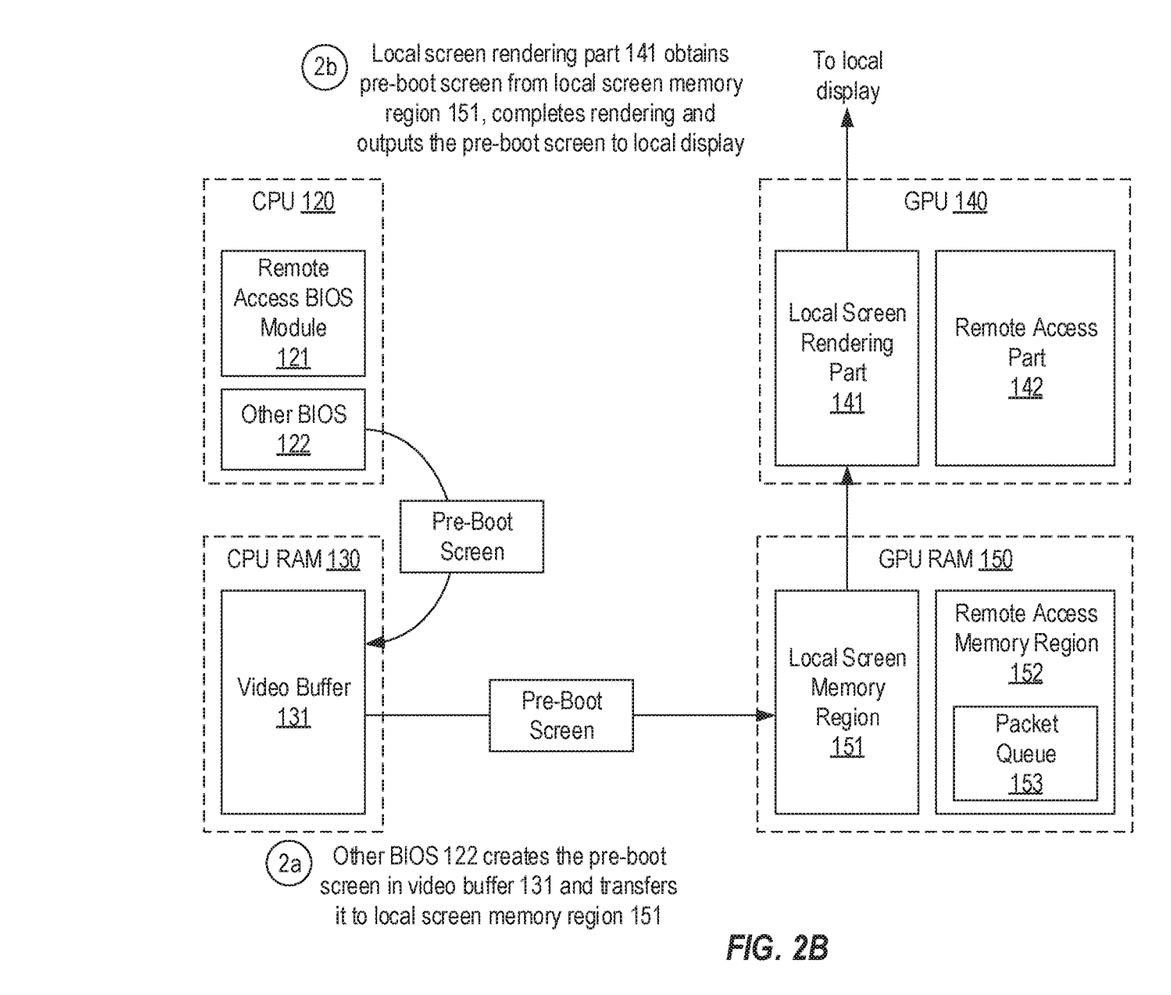

Turning to FIG. 2B, with GPU 140 and GPU RAM 150 logically split, local screen rendering part 141 and local screen memory region 151 can be used in a typical manner to cause the pre-boot screen to be displayed locally. For example, in step 2a, other BIOS 122 is shown as creating/updating the pre-boot screen in video buffer 131 and then copying the pre-boot screen to local screen memory region 151. When local screen rendering part 141 detects that local screen memory region 151 is updated, it can retrieve the pre-boot screen stored in local screen memory region 151, complete the rendering process and then output the pre-boot screen to the local display. Steps 2a and 2b can be repeated whenever the pre-boot screen is updated.

Figure 2C:
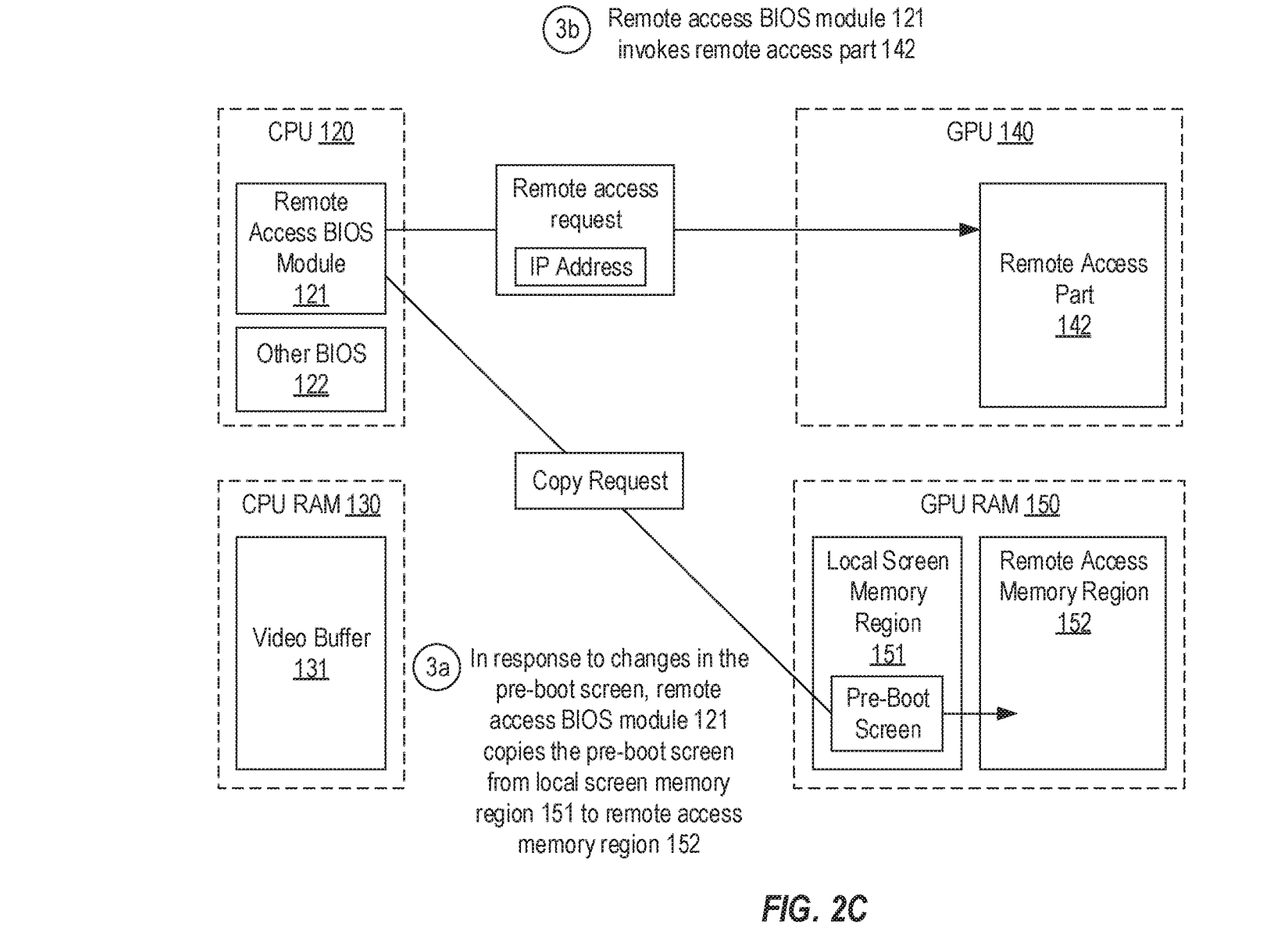
Figure 2D:
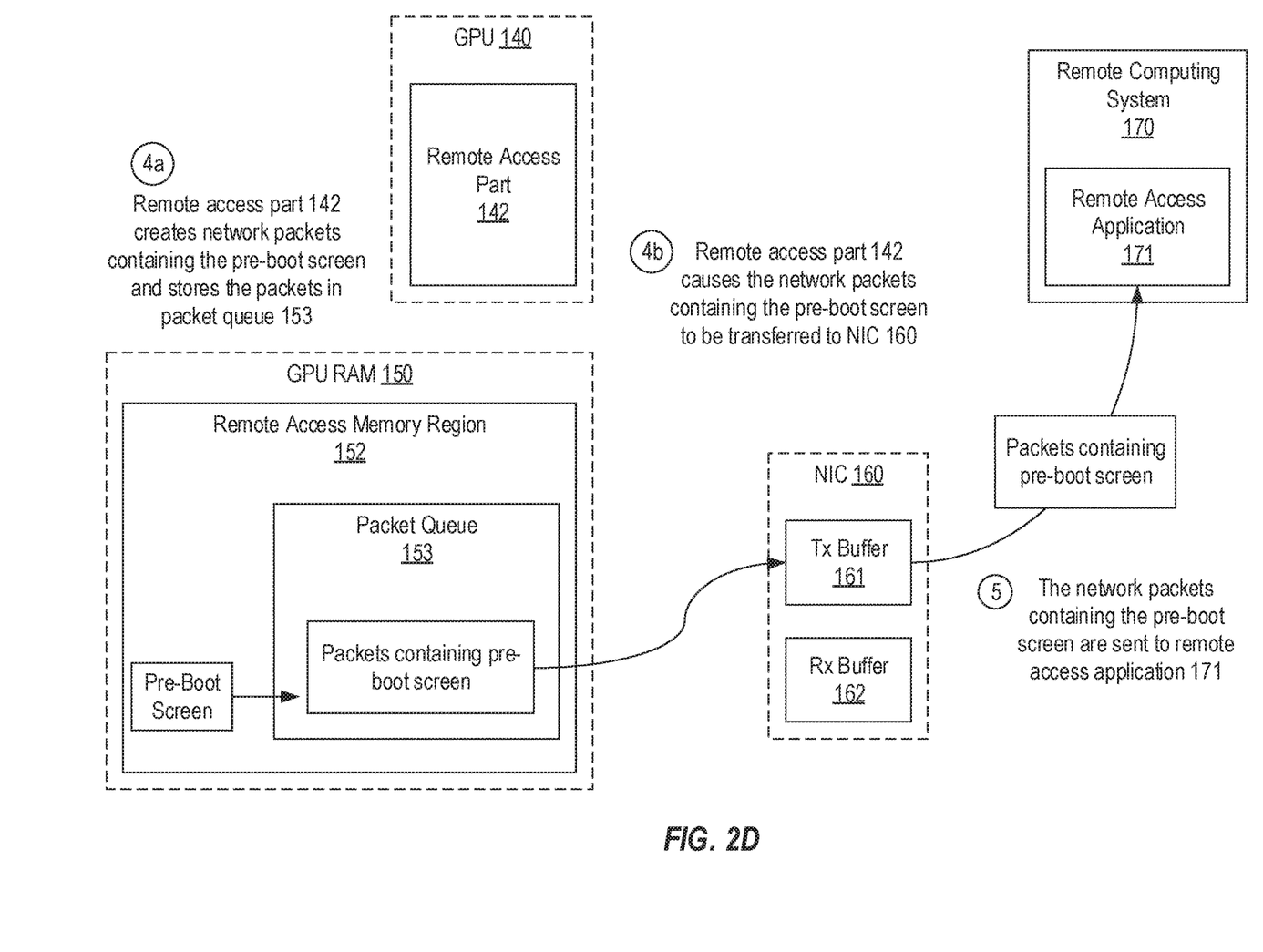
Figure 2E:
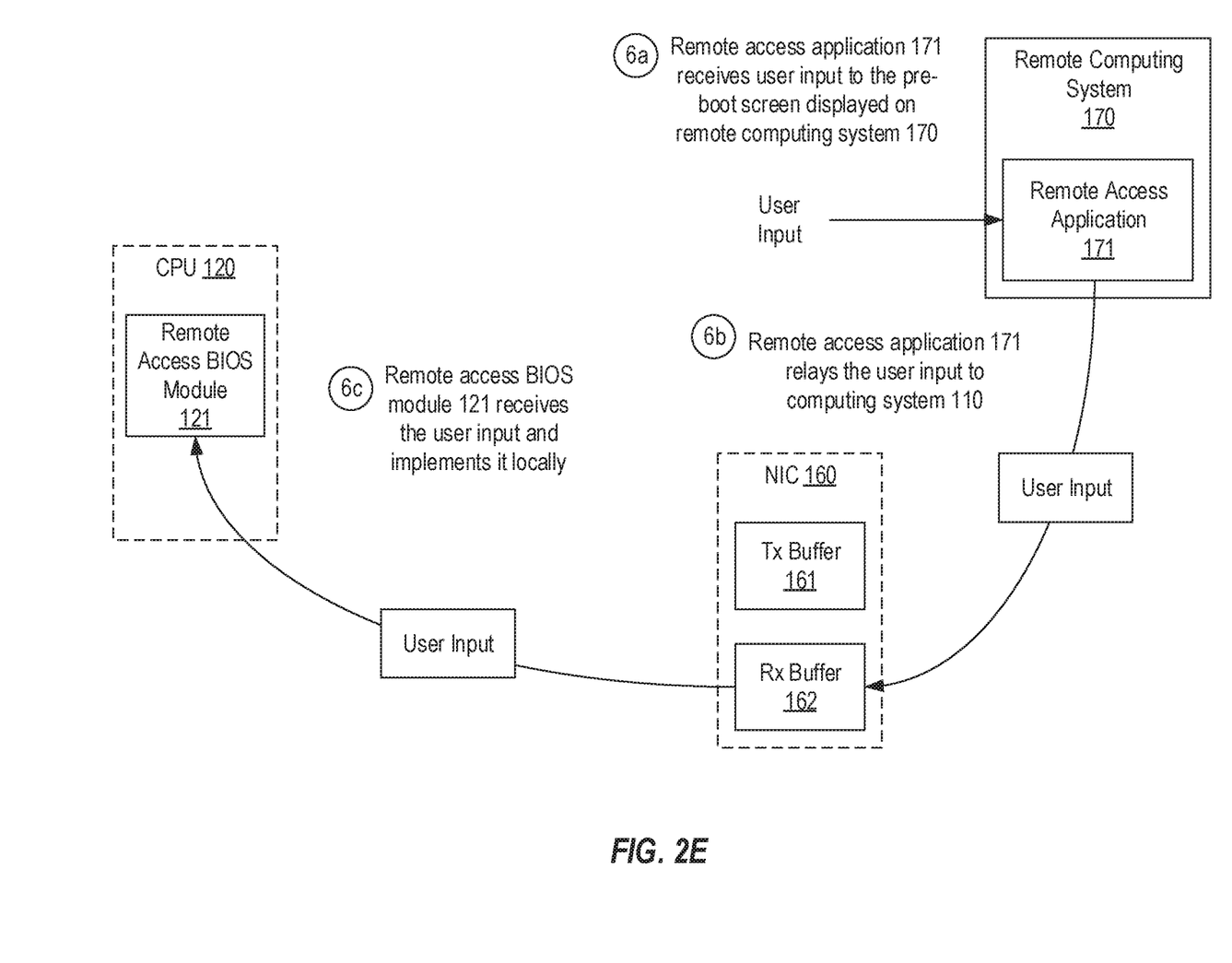

While steps 2a and 2b are being repeatedly performed to create and output the pre-boot screen locally, remote access BIOS module 121 can cause the pre-boot screen to be transferred to remote access application 171 for display on remote computing system 170. FIG. 2C-2E represent how this can be accomplished. In step 3a, when remote access BIOS module 121 detects changes in the pre-boot screen (e.g., when video buffer 131 and/or local screen memory region 151 is updated), it can cause the pre-boot screen to be copied from local screen memory region 151 to remote access memory region 152. For example, remote access BIOS module 121 could employ GPU 140's API to cause the content of local screen memory region 151 to be copied to a portion of remote access memory region 152.

In conjunction with copying the pre-boot screen to remote access memory region 152, in step 3b, remote access BIOS module 121 can invoke remote access part 142 such as by sending a remote access request to remote access part 142. A remote access request can instruct remote access part to transfer the pre-boot screen to remote access application 171 and, in some embodiments, can provide an IP address for this purpose. As referenced above, remote access BIOS module 121 could obtain this IP address from a storage location where it was stored prior to reboot. However, in some embodiments, remote access BIOS module 121 could be configured to employ a fixed IP address.

Turning to FIG. 2D, in step 4a, and in response to the remote access request, remote access part 142 can employ the pre-boot screen that has been copied to remote access memory region 152 to create network packets containing the pre-boot screen in packet queue 153. For example, remote access part 142 can create a payload that includes the pre-boot screen with appropriate application layer protocol headers (e.g., HTTP, HTTPS, WebSocket, etc.) and other formatting (e.g., HTML5, REST, XML, JSON, etc.). Remote access part 152 can also employ the IP address received in or specified by the remote access request as the destination IP address for each packet and an IP address of computing system 110 as the source IP address for each packet. Remote access part 142 could also include appropriate port numbers (e.g., a source port number employed by remote access BIOS module 121 and a destination port number employed by remote access application 171) and possibly other content to form appropriately formatted network packets for communicating with remote access application 171. Accordingly, as the pre-boot screen is updated, remote access part 142 can function similar to a web server by formatting the pre-boot screen into web-based content and a network protocol stack for creating and queuing network packets having payloads that contain the pre-boot screen.

In step 4b, remote access part 142 can cause the network packets containing the pre-boot screen in their payload to be transferred to NIC 160. For example, remote access part 142 could employ a peer-to-peer protocol, such as the PCIe peer-to-peer protocol, to directly transfer the network packets from packet queue 153 in GPU RAM 150 to Tx buffer 161 on NIC 160. Once the network packets are stored in Tx Buffer 161, in step 5, NIC 160 will cause the network packets to be transferred over the network connection between computing system 110 and remote computing system 170 (e.g., by adding layer two headers (or MAC addresses) to the IP packets and forwarded them over the network connection).

Once the network packets are received at remote computing system 170, the payloads of the network packets will be delivered to remote access application 171. Because remote access part 142 has formatted the payloads to comply with the appropriate application layer protocol (e.g., HTTPS) and as web-based content (e.g., HTML5 content), remote access application 171 (e.g., a browser) will be able to display the pre-boot screen in a similar manner as other web-based content is displayed. Therefore, a support technician using remote computing system 170 will be able to view the pre-boot screen of computing system 110.

Turning to FIG. 2E, while the pre-boot screen is displayed on remote computing system 170, the support technician can provide user input to remote access application 171. For example, the support technician could click on a button in the pre-boot screen or provide keyboard input to a text box that has focus in the pre-boot screen. In step 6a, remote access application 171 can receive this user input and create communications defining the user input. In step 6b, remote access application 171 can cause these communications defining the user input to be sent to computing system 110. For example, remote access application 171 could cause a network packet to be sent where the payload of the network packet identifies a location within the pre-boot screen where the support technician clicked or that identifies keys that the support technician has pressed. Such network packets will be routed to NIC 160 and temporarily stored in Rx buffer 162. The payloads of these network packets (e.g., HTTPS-formatted content) will then be delivered to remote access BIOS module 121 (e.g., due to remote access part 142 specifying a source port employed by remote access BIOS module 121 in the network packets sent to remote access application 171).

In step 6c, remote access BIOS module 121 can extract the user input from the payload and cause the user input to be implemented on computing system 110. For example, if the user input identifies that the support technician clicked at a particular location within the pre-boot screen displayed on remote computing system 170, remote access BIOS module 121 can cause a click to be performed at the same particular location within the pre-boot screen displayed on computing system 110. If this click causes an update to the pre-boot screen, steps 2a-5 could be repeated to cause the updated pre-boot screen to be displayed on remote computing system 170. In this way, a support technician will not only be able to view the pre-boot screen, but will also be able to interact with it, including to diagnose and fix any issues, such as BIOS issues, that computing system 110 may be experiencing.

Figure 3:
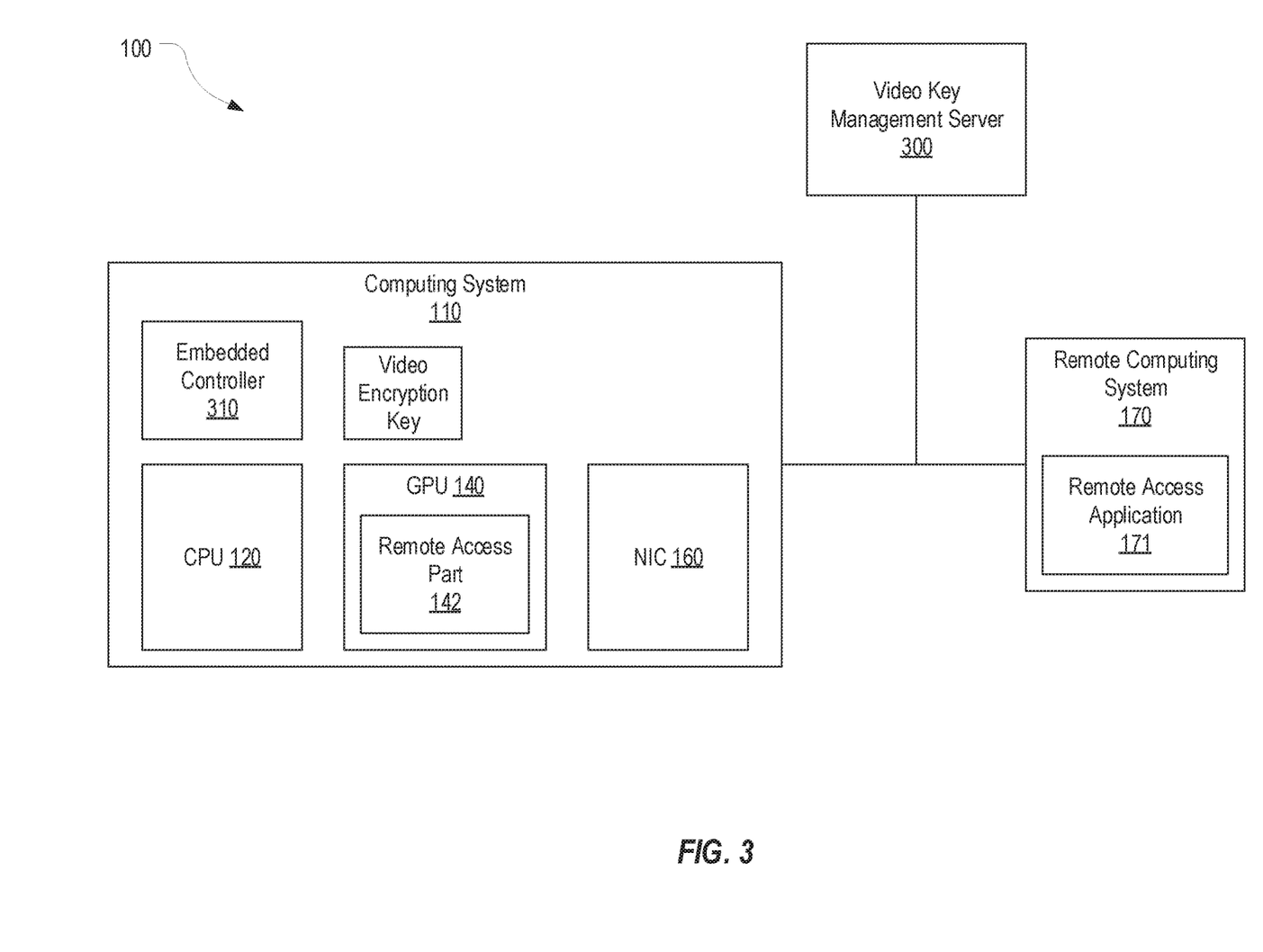
FIG. 3 illustrates how a secure tunnel can be employed when a pre-boot screen is accessed remotely.

In some embodiments, remote access part 142 may be configured to encrypt the pre-boot screen prior to sending it to remote access application 171. FIG. 3 illustrates how computing environment 100 may be configured in such embodiments. In comparison to FIG. 1, computing environment 100 in FIG. 3 includes a video key management server 300 and computing system 110 is shown as including an embedded controller 310. Embedded controller 310 can be configured to retrieve a video encryption key at startup. This video encryption key can be provisioned on computing system 110 as part of installing remote access BIOS module 121 or in any other suitable manner. Embedded controller 310 can make the video encryption key accessible to remote access part 142 so that it can encrypt the pre-boot screen as part of step 4a.

To be able to decrypt the encrypted pre-boot screen, remote access application 171 can interface with video key management server 300. For example, as part of accessing computing system 110, remote access application 171 may authenticate with video key management server 300 and, if successfully authenticated, may receive the corresponding video encryption key for decrypting the pre-boot screen. For example, the video encryption key employed on computing system 110 may be a private key and video key management server 300 may provide remote access application 171 with the corresponding public key after successful authentication. By using the video encryption key, remote access part 142 can create a secure tunnel with remote access application 171 that will prevent any unauthorized user from viewing the pre-boot screen.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for enabling a pre-boot screen to be accessed remotely, the method comprising:
    during pre-boot on a computing system, creating, by a remote access basic input/output system (BIOS) module that is executed on a central processing unit (CPU) of the computing system, a remote access part in a graphics processing unit (GPU) of the computing system and a remote access memory region in GPU memory;
    copying, by the remote access BIOS module, a pre-boot screen from a local screen memory region in the GPU memory to the remote access memory region;
    creating, by the remote access part, one or more network packets that include the pre-boot screen that was copied to the remote access memory region; and
    transferring, by the remote access part, the one or more network packets to a network interface card (NIC) to thereby cause the NIC to send the one or more network packets to a remote access application executing on a remote computing system.

2. The method of claim 1, wherein the remote access BIOS module is a Driver Execution Environment (DXE) driver.

3. The method of claim 1, further comprising:
    in conjunction with creating the remote access part in the GPU and the remote access memory region in GPU memory, creating a local screen rendering part in the GPU and the local screen memory region.

4. The method of claim 1, further comprising:
    in conjunction with copying the pre-boot screen from the local screen memory region to the remote access memory region, sending, by the remote access BIOS module, a remote access request to the remote access part;
    wherein the remote access part creates the one or more network packets in response to the remote access request.

5. The method of claim 4, wherein the remote access request specifies an IP address of the remote computing system.

6. The method of claim 5, wherein creating the one or more network packets comprises including the IP address in each of the one or more network packets.

7. The method of claim 1, wherein creating the one or more network packets that include the pre-boot screen comprise encapsulating the pre-boot screen in a payload of the one or more network packets.

8. The method of claim 7, wherein encapsulating the pre-boot screen in the payload of the one or more network packets comprises formatting the payload in accordance with an application layer protocol.

9. The method of claim 7, wherein encapsulating the pre-boot screen in the payload of the one or more network packets comprises formatting the pre-boot screen in accordance with a markup language.

10. The method of claim 1, wherein transferring the one or more network packets to the NIC comprises using a peer-to-peer protocol.

11. The method of claim 1, further comprising:
receiving, by the remote access BIOS module, user input that was received at the remote computing system while the pre-boot screen was displayed on the remote computing system; and
implementing the user input on the computing system.

12. The method of claim 1, wherein creating the one or more network packets that include the pre-boot screen comprises encrypting the pre-boot screen.

13. One or more computer storage media storing computer executable instructions which when executed on a computing system implement a method for enabling a pre-boot screen of the computing system to be accessed on a remote computing system, the method comprising:
copying, by a remote access BIOS module that executes on a CPU of the computing system, a pre-boot screen from a local screen memory region in GPU memory to a remote access memory region in GPU memory;
in conjunction with copying the pre-boot screen, sending, by the remote access BIOS module, a remote access request to a remote access part of a GPU of the computing system;
in response to the remote access request, creating, by the remote access part, one or more network packets containing the pre-boot screen that was copied to the remote access memory region, the one or more network packets including an IP address of the remote computing system; and
transferring, by the remote access part, the one or more network packets from the remote access memory region to a NIC of the computing system to thereby cause the one or more network packets to be sent to the remote computing system.

14. The computer storage media of claim 13, wherein the method further comprising:
creating, by the remote access BIOS module, the local screen memory region, the remote screen memory region and the remote access part.

15. The computer storage media of claim 13, wherein the IP address is included in the remote access request.

16. The computer storage media of claim 13, wherein creating the one or more network packets containing the pre-boot screen comprises formatting a payload of the one or more network packets in accordance with an application layer protocol.

17. The computer storage media of claim 13, wherein the method further comprises:
receiving, from the remote computing system, user input that was received while the pre-boot screen was displayed on the remote computing system; and
implementing the user input on the computing system.

18. A method for enabling a pre-boot screen to be accessed remotely, the method comprising:
in response to a pre-boot screen being updated on a computing system, copying, by a remote access BIOS module executing on a CPU, the pre-boot screen from a local screen memory region in GPU memory to a remote access memory region in GPU memory;
in response to the pre-boot screen being copied to the remote access memory region, creating, by a remote access part executing on a GPU, one or more network packets that include the pre-boot screen and storing the one or more network packets in a packet queue in the remote access memory region; and
transferring, by the remote access part, the one or more network packets from the packet queue to a NIC to thereby cause the NIC to send the one or more network packets to a remote access application executing on a remote computing system.

19. The method of claim 18, wherein the remote access BIOS module sends a remote access request to the remote access part when the pre-boot screen has been copied to the remote access memory region.

20. The method of claim 19, wherein creating the one or more network packets comprises including, in each network packet, an IP address of the remote computing system.

* * * * *